(12) United States Patent
Becerra et al.

(10) Patent No.: US 8,362,725 B2
(45) Date of Patent: Jan. 29, 2013

(54) RETROFIT MOTOR SYSTEM FOR HEATING, VENTILATION, AND AIR CONDITIONING APPLICATIONS

(75) Inventors: Roger C. Becerra, Fort Wayne, IN (US); Steven A. Nardin, Fort Wayne, IN (US); Michael R. Koller, Columbia City, IN (US); Andrew C. Barry, Fort Wayne, IN (US); Brian L. Beifus, Fort Wayne, IN (US); Andrew M. Knollman, Waterville, OH (US)

(73) Assignee: RBC Manufacturing Corporation, Beloit, WI (US)

( * ) Notice: Subject to any disclaimer, the term of this patent is extended or adjusted under 35 U.S.C. 154(b) by 0 days.

(21) Appl. No.: 13/412,350

(22) Filed: Mar. 5, 2012

(65) Prior Publication Data
US 2012/0161682 A1    Jun. 28, 2012

Related U.S. Application Data

(63) Continuation of application No. 12/188,336, filed on Aug. 8, 2008, now Pat. No. 8,143,828.

(51) Int. Cl.
*H02P 1/04* (2006.01)
(52) U.S. Cl. .................. 318/400.09; 318/471; 318/801; 318/51; 236/7; 236/67; 236/72; 236/91 D; 236/51; 324/417

(58) Field of Classification Search ............. 318/400.09, 318/471, 801, 51; 236/7, 51, 67, 72, 91 D; 324/417
See application file for complete search history.

(56) References Cited

U.S. PATENT DOCUMENTS

| | | |
|---|---|---|
| 4,707,646 A | 11/1987 | Thompson et al. |
| 5,410,230 A | 4/1995 | Bessler et al. |
| 5,651,264 A | 7/1997 | Lo et al. |
| 5,818,194 A | 10/1998 | Nordby |
| 6,423,118 B1 | 7/2002 | Becerra et al. |
| 7,671,555 B2 * | 3/2010 | Mullin ........................ 318/471 |
| 2008/0237217 A1 * | 10/2008 | Helt .............................. 219/485 |

* cited by examiner

*Primary Examiner* — Walter Benson
*Assistant Examiner* — Erick Glass
(74) *Attorney, Agent, or Firm* — Armstrong Teasdale LLP

(57) ABSTRACT

A motor control system for heating, ventilation, and air conditioning (HVAC) applications is described. The motor control system includes a thermostat and an electronically commutated motor (ECM) coupled to the thermostat. The ECM is configured to retrofit an existing non-ECM electric motor included in an HVAC application and to operate in one of a plurality of HVAC modes. The HVAC modes include at least one of a heating mode, a cooling mode, and a continuous fan mode. The HVAC mode is determined based at least partially on outputs provided by the thermostat.

16 Claims, 6 Drawing Sheets

RETROFIT MOTOR SYSTEM FOR HEATING, VENTILATION, AND AIR CONDITIONING APPLICATIONS

CROSS-REFERENCE TO RELATED APPLICATION

This application is a continuation application of, and claims priority to, U.S. patent application Ser. No. 12/188,336, filed Aug. 8, 2008 now U.S. Pat. No. 8,143,828 which is hereby incorporated by reference in its entirety.

BACKGROUND OF THE INVENTION

The field of this invention relates generally to heating, ventilation, and air conditioning (HVAC) applications, and more specifically, to electronically commutated motors (ECM) for HVAC applications. An ECM may also be referred to as a Brushless DC motor (BLDC) or a Permanent Magnet Synchronous motor.

A typical HVAC application consists of a thermostat, a furnace or fan coil, a system controller, and a fan motor. User settings and current temperature measurements are used by the thermostat to provide the system controller with signals indicating the mode in which the HVAC application should operate. For example, a user may input into the thermostat a desired temperature of 67° F. If the measured temperature of the room is 60° F., the thermostat would signal the system controller to enter a heating mode.

The system controller energizes the fan motor via a set of relays based on the information provided to the system controller by the thermostat. Typically, certain known HVAC applications, such as residential HVAC systems, include a permanent split capacitor (PSC) electric motor. Such motors may have various power ratings, for example, ⅙ horsepower (hp), ⅕ hp, ¼ hp, ⅓ hp, ½ hp, and ¾ hp. Also, motors having the same power rating may have different torque ratings. The horsepower and torque of a motor is selected dependent upon the application. This leads to the large number of different PSC motors currently in use in HVAC applications. Repair and maintenance of HVAC applications is complicated due to the large number of different PSC motors that may be included in an HVAC application. In order for a mobile service technician to properly service HVAC applications, the technician must transport tools and parts to service the variety of PSC motors that may be encountered while at a service call.

Known induction motors in HVAC applications operate using cooling or heating speeds without a dedicated continuous fan speed, which limits an efficiency of the HVAC system. Increased control of HVAC fan motor speeds would be desirable to provide energy savings, increase comfort from greater variations in air handling, and reduce HVAC system noise.

BRIEF DESCRIPTION OF THE INVENTION

In one aspect, a motor control system for heating, ventilation, and air conditioning (HVAC) applications is provided. The motor control system includes a thermostat and an electronically commutated motor (ECM) coupled to the thermostat. The ECM is configured to retrofit an existing non-ECM electric motor included in an HVAC application and to operate in one of a plurality of HVAC modes. The HVAC modes include at least one of a heating mode, a cooling mode, and a continuous fan mode. The HVAC mode is determined based at least partially on outputs provided by the thermostat.

In another aspect, a method of retrofitting a heating, ventilation, and air conditioning (HVAC) system that includes an original non-electronically commutated electric motor to include an electronically commutated motor (ECM) is provided. The method includes selecting an ECM based on at least one of a horsepower rating of the original motor and a system capacity requirement of the HVAC system for at least one of heating, cooling, and air-moving. The method also includes configuring the selected ECM to receive signals from a thermostat and to select one of a plurality of stored motor operating profiles based at least partially on signals received from the thermostat. The method also includes configuring the selected ECM to provide heating and cooling airflow that is substantially similar to the non-ECM electric motor replaced by the ECM.

In yet another aspect, a motor unit for retrofitting a heating, ventilation, and air conditioning (HVAC) system that includes an original non-electronically commutated electric motor to include an electronically commutated motor (ECM) is provided. The motor unit includes an ECM, control circuitry coupled to the ECM, and an interface module coupled to the control circuitry. The control circuitry is configured to determine which one of a plurality of stored motor operating profiles the ECM operates in based on a selected mode of operation. The interface module is configured to receive signals from a thermostat and a system controller and to provide the control circuitry with the selected mode of operation based on the received signals.

DETAILED DESCRIPTION OF THE INVENTION

Figure 1:
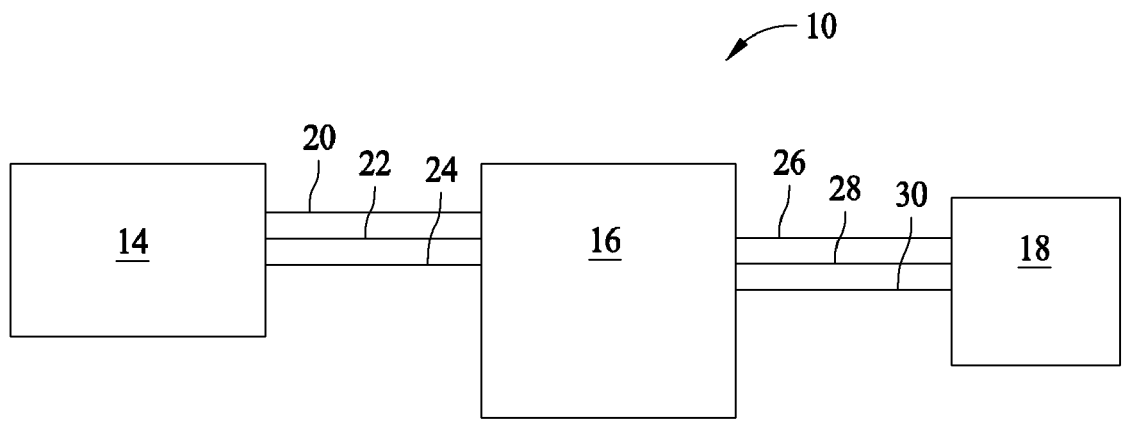
FIG. 1 is a block diagram of a known heating, ventilation, and air conditioning (HVAC) control system.

FIG. 1 is a block diagram of a known heating, ventilation, and air conditioning (HVAC) fan motor control system 10. HVAC fan motor control system 10 is included in an HVAC application (not shown in FIG. 1), such as, but not limited to, a residential HVAC system and a commercial HVAC system. Fan motor control system 10 includes a thermostat 14, a system controller 16, and a fan motor 18. Thermostat 14 is configured to control the mode in which the HVAC application is operating, for example, a cooling mode, a heating mode, or a fan only mode. Typically, cooled air is circulated through the HVAC system when in the cooling mode, heated air is circulated through the HVAC system in the heating mode, and air that has not been heated or cooled is circulated through the HVAC system in the fan only mode.

The mode of operation is determined by thermostat 14 based on user selections and a measured temperature. For example, in one embodiment, thermostat 14 includes a switch that enables a user to select from "OFF," "COOL," or "HEAT" (not shown in FIG. 1). When "OFF" is selected, thermostat 14 signals system controller 16 to turn off the HVAC application. When "COOL" or "HEAT" is selected, thermostat 14 signals system controller 16 to operate the HVAC application in cooling mode or in heating mode, cooling mode, or fan only mode depending upon the current measured temperature and the set desired temperature. Thermostat 14 may include a temperature sensing device, for example, a thermistor, or may be coupled to a temperature sensing device (not shown in FIG. 1) positioned remotely from thermostat 14.

Thermostat 14 may also include a switch that enables a user to select fan modes, for example, either "ON" or "AUTO" (not shown in FIG. 1). When "ON" is selected, thermostat 14 signals system controller 16 to continuously operate the fan. When "AUTO" is selected, the signal sent from thermostat 14 to system controller 16 depends upon the measured temperature and the set desired temperature, and the fan may either be on or off. Thermostat 14 typically includes three output leads coupled to system controller 16, a cooling output 20, a fan only output 22, and a heating output 24. Fan motor 18 typically includes three inputs, a heat/fan input 26, a cool/fan input 28, and a power input 30. In the example illustrated, system controller 16 provides fan motor 18 with 120 volts alternating current (VAC) at power input 30 and either heat/fan input 26 or cool/fan input 28.

Thermostat 14 provides a signal to system controller 16. The signal may include a call for cooling, heating, or fan only operation of the HVAC application. When system controller 16 receives a signal from cooling output 20 and fan output 22, system controller 16 activates relays and completes a circuit that includes cool/fan input 28 and power input 30, which enables motor 18 to operate at a cool/fan speed. System controller 16 also signals, for example, air conditioning components (not shown in FIG. 1) of the HVAC application to begin operating.

When system controller 16 receives a signal from heating output 24, system controller 16 activates relays and completes a circuit that includes heating/fan input 26 and power input 30, which enables motor 18 to operate at a heat/fan speed. System controller 16 also signals, for example, a heating element/furnace (not shown in FIG. 1) of the HVAC application to begin operating. System controller 16 controls the timing of these signals. For example, system controller 16 may signal the heating element to begin operating, and after a predetermined period of time has passed, activate a relay to enable fan motor 18 to begin operating. This delay prevents fan motor 18 from circulating non-heated air when heated air is desired. Furthermore, system controller 16 may signal the heating element to discontinue operating, and after a predetermined period of time has passed, de-activate the relay to discontinue operation of fan motor 18. This delay enables the heat energy still emanating from the heating element, even after power to the heating element is discontinued, to be extracted and distributed by fan motor 18.

The fan speed may be different when a cooling mode is selected than when a heating mode is selected, however, PSC motors have a limited range of operating speeds. The limited range of operating speeds also restricts varying the operating speed of a fan only mode as compared to a cooling mode and a heating mode. Typically, when system controller 16 receives a signal from fan only output 22, system controller 16 instructs fan motor 18 to operate at the same speed as if fan motor control system 10 was in the cooling or heating mode. Additionally, when the speed of a PSC motor is varied, the efficiency of the PSC motor may be reduced.

Figure 2:
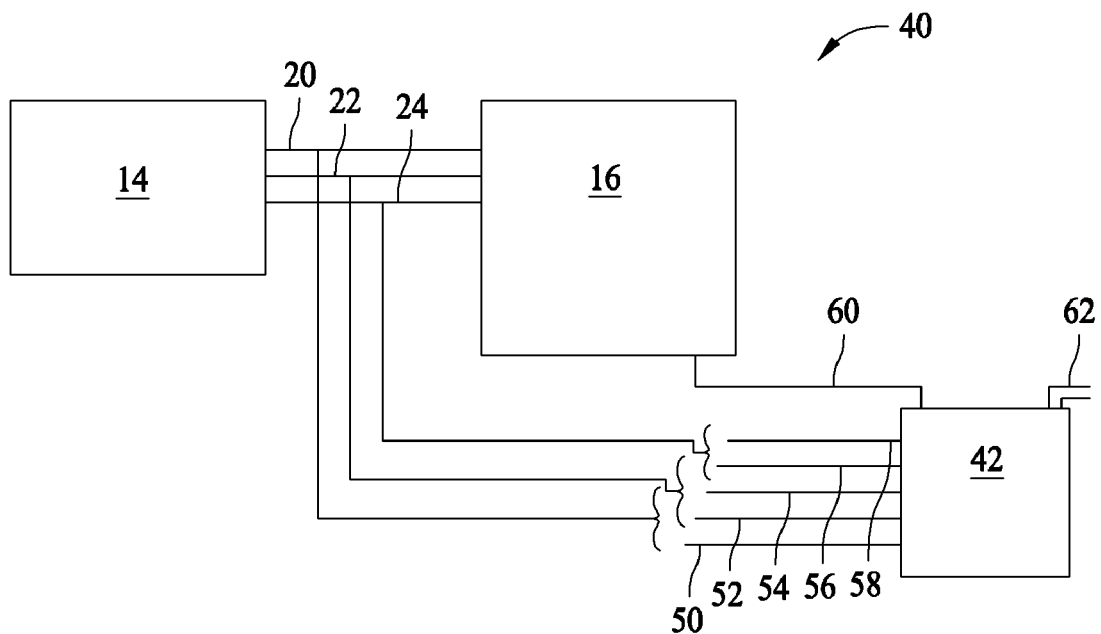
FIG. 2 is a block diagram of an exemplary embodiment of an HVAC control system that includes an electronically commutated motor (ECM)

FIG. 2 is a block diagram of an exemplary embodiment of an HVAC fan motor control system 40 that includes a retrofit electronically commutated motor (ECM) 42, also referred to as a brushless direct current (DC) motor. In the exemplary embodiment, an HVAC system (not shown in FIG. 2) is retrofit to include ECM 42. HVAC fan motor control system 40 facilitates replacing fan motor 18 (shown in FIG. 1) with a replacement motor, for example, but not limited to, retrofit ECM 42.

Retrofit ECM 42 is described herein as a fan motor for a residential HVAC system. However, retrofit ECM 42, HVAC fan motor control system 40, and methods described herein for retrofitting an HVAC system with retrofit ECM 42 may also be applied to any other HVAC applications including, but not limited to, commercial HVAC applications. Furthermore, retrofit ECM 42 is described as replacing a PSC fan motor 18. However, retrofit ECM 42 may also be used as described herein to replace any other type of motor used in HVAC applications such as, but not limited to, furnaces, fan coils, heat pumps, and condenser motors.

In the exemplary embodiment, as is also included in HVAC fan motor control system 10 (shown in FIG. 1), HVAC fan motor control system 40 includes thermostat 14. In the exemplary embodiment, thermostat 14 includes cooling output 20, heating output 22, and fan only output 24. ECM 42 includes five motor speed selection inputs, for example, a first input 50, a second input 52, a third input 54, a fourth input 56, and a fifth input 58. Fan motor control system 40 is illustrated as including system controller 16, however, in the exemplary embodiment, system controller 16 is included in FIG. 2 because typically system controller 16 is a convenient location within an HVAC application to connect a common side 60 of a power circuit that also includes a power input 62. Alternatively, common side 60 may be coupled anywhere that facilitates forming a closed power circuit that includes power input 62, ECM 42, and common side 60.

In the exemplary embodiment, ECM 42 is constantly provided with a supply of electricity from power input 62. The constant power supplied to ECM 42 is used to operate ECM 42 when a signal from at least one of first input 50, second input 52, third input 54, fourth input 56, and fifth input 58 places ECM 42 in an operating state. In the example embodiment, since power is constantly supplied to ECM 42, first input 50, second input 52, third input 54, fourth input 56, and fifth input 58 may receive signals, rather than a level of electricity sufficient to run ECM 42, that instruct ECM 42 to operate in a specific mode. The lower-voltage, signal-level signals may be delivered to ECM 42 using wires, or through the use of wireless communication (not shown in FIG. 2). Also, electronics within ECM 42 may draw relatively high current at start-up. Constantly providing power to ECM 42, rather than switching the power "ON" and "OFF" each time the motor is instructed to operate, facilitates reducing wear on line power switching device contacts within ECM 42.

In the exemplary embodiment, cooling output 20, heating output 22, and fan only output 24 bypass system controller 16 and are directly coupled to retrofit ECM 42. An installer of retrofit ECM 42 selects which of first input 50, second input 52, third input 54, fourth input 56, and fifth input 58 are coupled to cooling output 20, heating output 22, and fan only output 24, respectively. Each of first input 50, second input 52, third input 54, fourth input 56, and fifth input 58 correspond to a motor profile stored in retrofit ECM 42, and are described further below. An electrical power source (not shown in FIG. 2) provides electricity to power input 62 of ECM 42, for example, 120 VAC. In the exemplary embodiment, ECM 42 is configured to operate according to one of the five motor profiles stored in ECM 42. The signals provided to the signal inputs 50, 52, 54, 56, and 58 that are connected to thermostat 14 are low voltage signals, for example, but not limited to, 24 VAC signals, that indicate which of the five modes ECM 42 is to operate.

As stated above, HVAC systems currently in use include a wide variety of fan motors having, for example, various horsepower ratings. In the exemplary embodiment, ECM 42 is selected based on the horsepower rating of the motor being replaced and/or based on airflow requirements of the HVAC system. In the residential HVAC context, original motor 18 (shown in FIG. 1) may include, for example only, a ⅙ horsepower (hp) PSC motor, a ⅕ hp PSC motor, a ¼ hp PSC motor, a ⅓ hp PSC motor, a ½ hp PSC motor, or a ¾ hp PSC motor. The variety of motors currently included in HVAC systems complicates service and repair and increases the parts and tools a mobile service technician must bring to a service call in order to service or repair the HVAC system at that site.

In the example residential HVAC system described above, HVAC fan motor control system 40 facilitates retrofitting an HVAC system including any one of the above listed PSC motors with a one horsepower ECM. In an alternative embodiment, the HVAC system is retrofit with either the one horsepower ECM or a one-half horsepower ECM. The one-half horsepower ECM, typically of smaller dimensions than a one horsepower ECM, is well suited for retrofitting an HVAC system having limited space for the retrofit motor. Retrofitting HVAC systems with only two retrofit motors reduces the number of parts and tools a mobile service technician needs to carry in order to service or repair an HVAC system on site.

In the alternative embodiment described above where retrofit ECM 42 is selected from either a one horsepower ECM or a one-half horsepower ECM, retrofit ECM 42 is selected based on at least one of a horsepower rating of original motor 18 and system airflow capacity requirements of the HVAC system. In the alternative embodiment, if original motor 18 has a horsepower rating of over one-half horsepower, a one horsepower ECM 42 is selected to replace original motor 18. In the alternative embodiment, if original motor 18 has a horsepower rating of less than or equal to one-half horsepower, airflow requirements of the HVAC system are analyzed to determine which retrofit ECM 42 to select and install. In the alternative embodiment, if original motor 18 has a horsepower rating of less than or equal to one-half horsepower, and cooling airflow requirements are less than or equal to three tons, a one-half horsepower ECM 42 is selected to replace original motor 18. Furthermore, if original motor 18 has a horsepower rating of less than or equal to one-half horsepower, and heating airflow requirements are less than or equal to 100,000 British thermal units (BTU), a one-half horsepower ECM 42 is selected to replace original motor 18. And furthermore, if original motor 18 has a horsepower rating of less than or equal to one-half horsepower, and cooling airflow requirements are greater than three tons or heating airflow requirements are greater than 100,000 BTU, a one horsepower ECM 42 is selected to replace original motor 18.

The above described residential HVAC system embodiments, and the associated horsepower ratings, cooling airflow requirements, and heating airflow requirements, are described for example purposes only. Larger HVAC systems may include original motors having higher horsepower ratings than described above, and also higher cooling and/or heating airflow requirements. The above described method of selecting retrofit ECM 42 may be used with any HVAC system, by changing the power ratings of the original motors, the power ratings of the retrofit ECMs, and the airflow requirements of the HVAC system being retrofitted.

Table I illustrates the relationship between the states of cooling output 20, heating output 22, and fan only output 24 of thermostat 14 (shown in FIG. 2) and an output of system 40. In the exemplary embodiment, outputs 20, 22, and 24 signal ECM 42 to operate in one of six different modes, for example, but not limited to, a System Off mode, an Auto Cooling mode, a Cooling On mode, a Heating On mode, an Auto Heating mode, and a Fan On mode.

TABLE I

| THERMOSTAT STATE | | | |
|---|---|---|---|
| Heating Output | Fan Only Output | Cooling Output | SYSTEM OUTPUT MODE |
| Off | Off | Off | Off |
| Off | Off | On | Cooling Auto |
| Off | On | On | Cooling On |
| On | On | Off | Heating On |
| On | Off | Off | Heating Auto |
| Off | On | Off | Continuous Fan |

In the exemplary embodiment, ECM 42 is programmed to recognize the six different modes, System Off mode, Continuous Fan mode, two Heating Modes, and two Cooling Modes. The Heating Modes include Heating On mode and Auto Heating mode. The Cooling Modes include Cooling On mode and Auto Cooling mode.

In the exemplary embodiment, when all of cooling output 20, heating output 22, and fan only output 24 are "OFF," the HVAC system is in System Off mode, or in other words, not operating. The HVAC system is activated when any of cooling output 20, heating output 22, and fan only output 24 produces an "ON" signal. When cooling output 20 is "ON" and heating output 22 and fan only output 24 are "OFF," the HVAC system is in Auto Cooling mode. When in Auto Cooling mode, whenever thermostat 14 signals the HVAC system to cool, ECM 42 is also signaled to run at a Cooling Mode speed, and conversely, whenever the HVAC system is not cooling, ECM 42 is not running.

When both cooling output 20 and fan only output 24 are "ON," the HVAC system is in a Cooling On mode. When in Cooling On mode, whenever thermostat 14 signals the HVAC system cool, ECM 42 is signaled to run at Cooling Mode speed. However, when in Cooling On mode, whenever the HVAC system is not cooling, ECM 42 runs at a Continuous Fan mode speed. Continuous Fan mode speed is lower than Cooling Mode speed. Continuous Fan mode speed maintains air circulation through the HVAC system, while consuming less energy and producing less noise than if ECM 42 was run at Cooling Mode speed.

When heating output 22 is "ON" and cooling output 20 and fan only output 24 are "OFF," the HVAC system is in an Auto Heating mode. When in Auto Heating mode, whenever thermostat 14 signals the HVAC system to heat, ECM 42 also runs at a Heating Mode speed, and conversely, whenever the HVAC system is not heating, ECM 42 is not running.

When both heating output 22 and fan only output 24 are "ON," the HVAC system is in a Heating On mode. When in Heating On mode, whenever thermostat 14 signals the HVAC system to heat, ECM 42 runs at Heating Mode speed. However, when in Heating On mode, whenever the HVAC system is not heating, ECM 42 runs at Continuous Fan mode speed. Continuous Fan mode speed is lower than Heating Mode speed, which maintains air circulation through the HVAC system, while consuming less energy and producing less noise than if ECM 42 was run at Heating Mode speed.

When fan only output 24 is "ON," cooling output 20 is "OFF," and heating output 22 is "OFF," thermostat 14 signals the HVAC system to ender a Continuous Fan mode. When in Continuous Fan mode, ECM 42 runs at a lower speed than Cooling Mode speed and Heating Mode speed. Continuous Fan mode enables the HVAC system to circulate air throughout a building, even when not heating or cooling, while operating ECM 42 at a lower speed than Cooling Mode or Heating Mode. In an exemplary embodiment, the ECM 42 speed in Continuous Fan mode is half that of Cooling Mode motor speed or Heating Mode motor speed. The lower fan speed reduces the amount of energy used by ECM 42, enables continuous filtering of the air without running ECM 42 at maximum speed as would be necessary with original motor 18 (shown in FIG. 1), and increases comfort over that provided by original motor 18 due to the continuous filtering and circulation of the air and by reducing operating noise.

Figure 3:
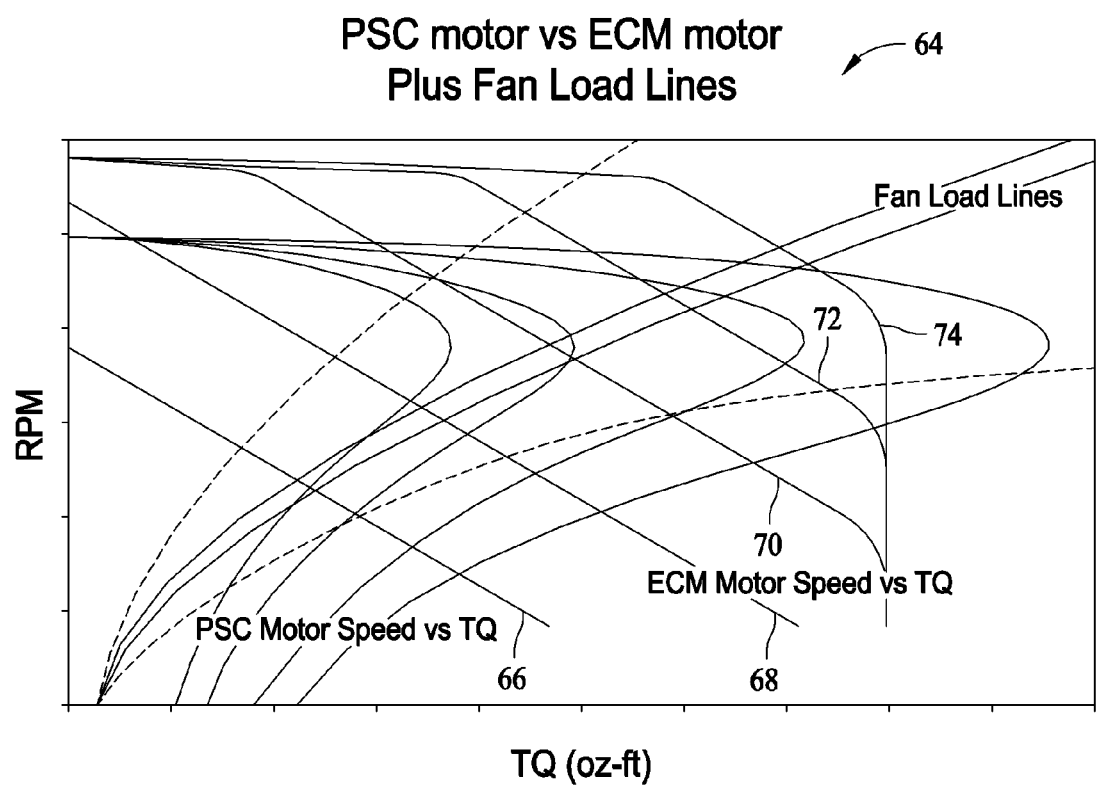
FIG. 3 is a chart of exemplary torque versus speed curves for five motor profiles of the ECM of FIG. 2.

FIG. 3 is a chart 64 of exemplary torque versus speed curves for five motor profiles of ECM 42. ECM 42 stores a plurality of motor operating profiles, each of which correspond to one of the plurality of HVAC modes described above. In the exemplary embodiment, chart 64 illustrates five torque versus speed curves that correspond to five motor profiles included in ECM 42. In the exemplary embodiment, the five motor profiles included in ECM 42 correspond to, for example, a first curve 66, a second curve 68, a third curve 70, a fourth curve 72, and a fifth curve 74. In the exemplary embodiment, a service technician selects three of the five motor profiles when installing retrofit ECM 42, each selected profile corresponding to one of the Cooling Mode, the Heating Mode, and the Continuous Fan Mode. The selected three motor profiles are based on at least one of HVAC system characteristics and an on-site heat rise test of the HVAC system including retrofit ECM 42.

Figure 4:
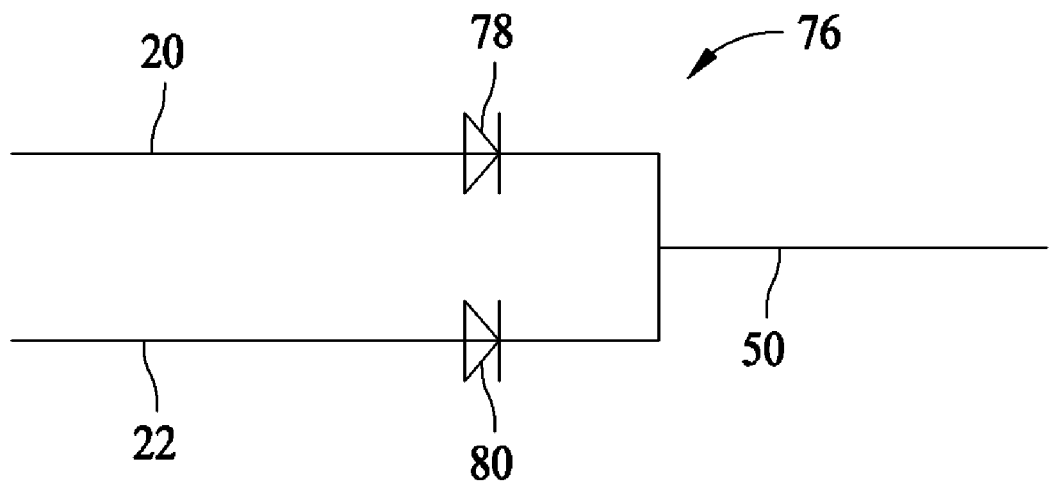
FIG. 4 is an exemplary embodiment of a diode configuration for placement between a thermostat and ECM.

In an embodiment where a service technician determines that using a single motor profile for two of the three modes would be desirable, two of outputs 20, 22, and 24 are connected to one of ECM motor inputs 50, 52, 54, 56, and 58 (shown in FIG. 2). However, this connection may short the heating and cooling call provided to system controller 16, which would negatively affect operation of system controller 16. FIG. 4 illustrates an exemplary diode configuration 76 positioned between thermostat 14 (shown in FIG. 2) and one of motor inputs 50, 52, 54, 56, and 58 (shown in FIG. 2). In order to prevent a short of the heating and cooling calls provided to system controller 16, a first diode 78 is positioned between, for example, output 20 and input 50, and a second diode 80 is positioned between output 22 and input 50. In an embodiment where it is desired that ECM 42 operate at only one speed, all three outputs 20, 22, and 24 are connected to a single input of ECM 42. In order to prevent shorting of the calls provided to system controller 16, a diode is positioned between output 20 and the selected input of ECM 42, between output 22 and the selected input of ECM 42, and between output 24 and the selected input of ECM 42.

In the exemplary embodiment, profiles corresponding to curves 66, 68, 70, 72, and 74 are neither constant speed nor constant torque. Rather, profiles corresponding to curves 66, 68, 70, 72, and 74 are configured to substantially emulate performance characteristics of original motors, for example, original motor 18, operating at a nominal HVAC system pressure. Also, when compared to original motor 18, the flexibility of the motor profiles that correspond to curves 66, 68, 70, 72, and 74, in combination with the capabilities of ECM 42, enable improved performance of ECM 42 within the HVAC system at high static pressures. An HVAC system may have a high static pressure for many reasons, for example, high static pressure may be caused by poor design of the system (e.g., inadequately sized ducts for the airflow desired) or clogged/dirty filters. More specifically, ECM 42 may provide improved performance over original motor 18 (shown in FIG. 1) by providing the HVAC system with a substantially constant airflow regardless of HVAC system static pressure. This may be accomplished because of the flexibility provided by the motor profiles of ECM 42.

As described above, in HVAC fan motor control system 10 of FIG. 1, system controller 16 provides the HVAC system with delays that are beneficial to the efficiency of the HVAC application. As is also described above, cooling output 20, heating output 22, and fan only output 24 of thermostat 14 bypass system controller 16 and are directly coupled to retrofit ECM 42 in HVAC fan motor control system 40 of FIG. 2. In the exemplary embodiment of FIG. 2, ECM 42 of HVAC fan motor control system 40 is unable to benefit from the delays provided by system controller 16.

Figure 5:
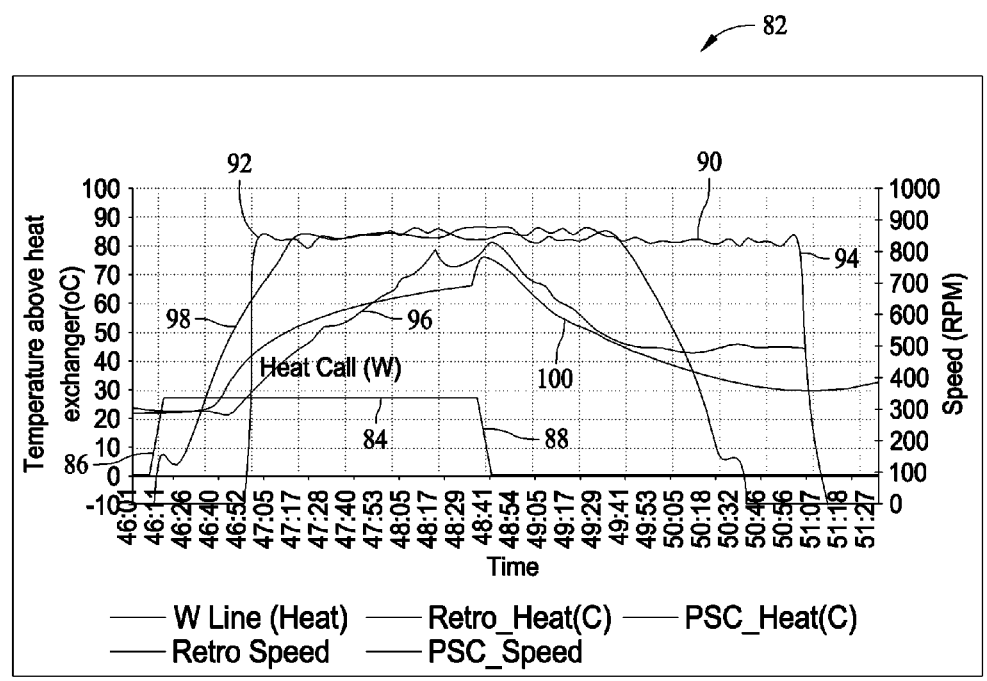
FIG. 5 is a chart of motor speeds and temperatures of two exemplary HVAC systems measured over time after a request for Heat Mode is made.

FIG. 5 is a chart 82 of motor speeds and measured temperatures of two exemplary HVAC systems over time after thermostat 14 (shown in FIGS. 1 and 2) requests the HVAC system enter Heat Mode. Plot 84 illustrates a signal from thermostat 14 (shown in FIGS. 1 and 2) to enter Heating Mode, the signal placing HVAC system in Heating Mode starting at leading edge 86 and ending at trailing edge 88. Plot 90 is of a fan speed of original motor 18 of HVAC fan motor control system 10 (shown in FIG. 1) over time, where original motor 18 is turned on at leading edge 92 and turned off at trailing edge 94. Plot 96 is of a heat rise temperature produced by an HVAC system that includes original motor 18. Plot 98 is of a fan speed of retrofit ECM 42 (shown in FIG. 2) over time. Plot 100 is of a heat rise temperature produced by an HVAC system that includes ECM 42.

Plot 86 and plot 92 illustrate the system controller 16 (shown in FIG. 1) provided delay between receiving a signal to enter Heating Mode from thermostat 14 (shown in FIG. 1) and signaling motor 18 to turn on. Plot 86 and plot 92 also illustrate the delay provided by system controller 16 after receiving a signal to end Heating Mode and system controller 16 signaling motor 18 to turn off. As described above, these delays enable, for example, a heating element to warm up before motor 18 begins to circulate air past the heating element, and extraction of energy emitted by heating element even after the heating element is turned off. Plot 98 illustrates how a motor profile of ECM 42, that includes a reduced slew rate, emulates the delay provided by system controller 16. When thermostat 14 signals the HVAC system to discontinue Heating Mode, motor profile of ECM 42 also includes a reduced slew rate to emulate the delay provided by system controller 16. Plot 96 and plot 100 illustrate the similarity between the heat rise produced by HVAC fan motor control system 10 of FIG. 1 and HVAC fan motor control system 40 of FIG. 2.

Figure 6:
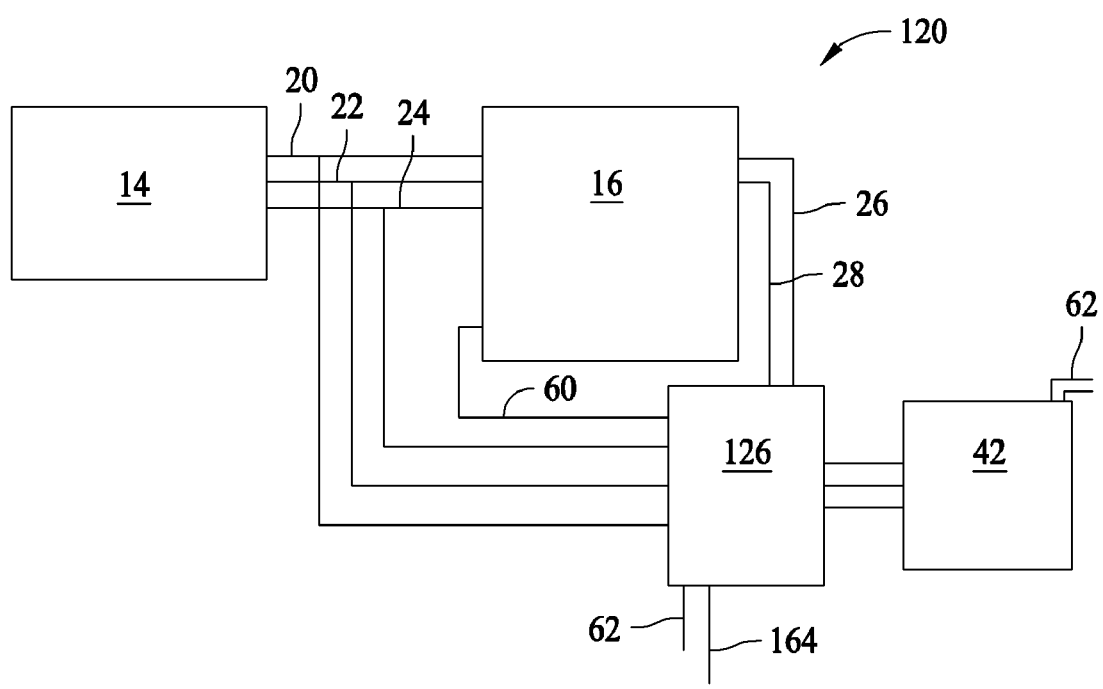
FIG. 6 is an alternative embodiment of an HVAC control system that includes an ECM and an interface module.

FIG. 6 is an alternative embodiment of an HVAC fan motor control system 120. HVAC fan motor control system 120 facilitates replacing fan motor 18 (shown in FIG. 1) with a replacement motor, for example, but not limited to, ECM 42. Components shared by motor control system 40 and motor control system 120 are identified with the same reference numerals. In system 120, ECM 42 is not only coupled to thermostat 14, but is also coupled to, and able to receive signals from, system controller 16. In the alternative embodiment, an interface module 126 receives signals from at least one of thermostat 14 and system controller 16. Based on the received signals, interface module 126 provides ECM 42 with control signals. More specifically, interface module 126 receives signals from thermostat outputs 20, 22, and 24, as well as from system controller outputs 26 and 28, and is configured to provide ECM 42 with a signal that selects a desired motor control profile. HVAC fan motor control system 120 enables use of at least one of the above described motor profiles, including the reduced slew rates, as well as the delays programmed into system controller 16, to operate the HVAC system efficiently. In some examples of the alternative embodiment, system 120 is configured to monitor thermostat outputs 20, 22, and 24. If no thermostat cooling or heating signals are detected, and either system controller output 26 or 28 is energized, ECM 42 operates in a continuous fan mode. In further examples, interface module 126 may be configured to determine ECM operation based only on signals from system controller outputs 26 and 28.

Figure 7:
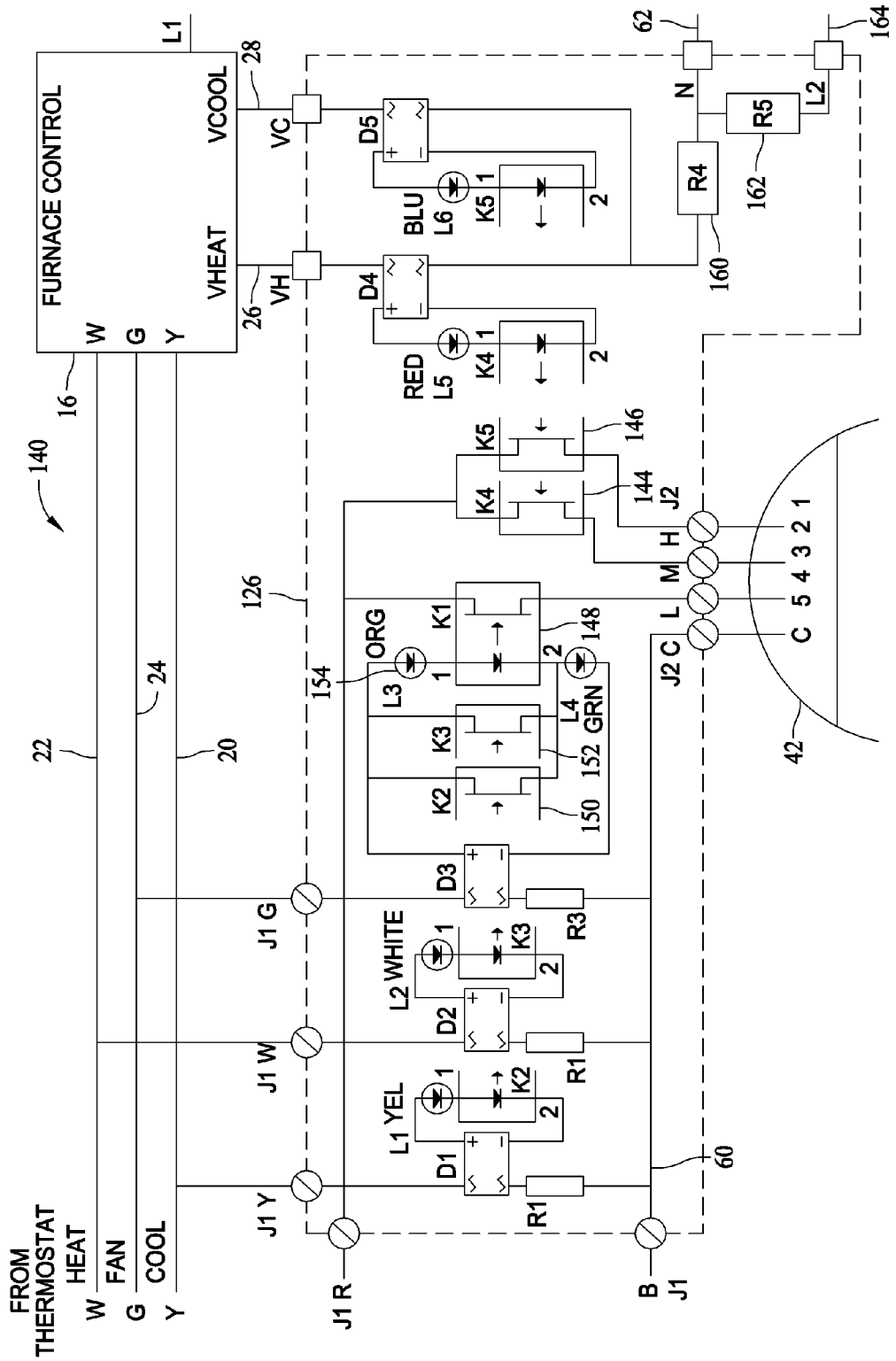
FIG. 7 is a circuit diagram of an exemplary embodiment of the HVAC control system shown in FIG. 6.

FIG. 7 is a circuit diagram 140 of an exemplary embodiment of HVAC fan motor control system 120. Circuit diagram 140 specifically illustrates an exemplary embodiment of interface module 126. Components also illustrated in FIG. 6 are identified with the same reference numerals in FIG. 7. Interface 126 enables system controller 16 to signal retrofit ECM 42 to operate at a Heating Mode speed or a Cooling Mode speed. As described above, Heating Mode speed and Cooling Mode speed, along with Continuous Fan Mode speed are determined by the motor profiles stored in retrofit ECM 42.

In the embodiment of FIG. 7, a signal from system controller 16 takes precedence over a Continuous Fan Mode signal from thermostat 14. System controller 16 provides signals to interface 128 through, for example, system controller outputs 128 and 130. When system controller 16 provides a Heating Mode or a Cooling Mode signal to interface 126, information stored in ECM 42 causes at least one of an output from relay 144 and 146 to override the output of relay 148. When thermostat 14 provides a Heating Mode or a Cooling Mode signal, at least one of relay 150 and 152 disable relay 148 by extinguishing light emitting diode (LED) 154. In the exemplary embodiment, interface 126 includes a plurality of various colored LEDs, such as, but not limited to, LED 154, LED 156, and LED 158, to aid in troubleshooting of interface 126. Also, in the exemplary embodiment, the relays, such as, but not limited to, relays 144, 146, 148, 150, and 152, are optically isolated metal oxide semiconductor field-effect transistor (MOSFET) relays. An example of commercially available optically isolated MOSFET relays are Photo-MOS™ relays, manufactured by Panasonic Electric Works Corporation of America. However, any relays that enable interface 126 to function as described herein may be used.

A resistor, or multiple resistors, for example resistors 160 and 162, allow interface 126 to operate while being supplied with one of two different power supply voltage levels. In the exemplary embodiment, if a 120 VAC power supply is available, it is provided to power input 62. If a 240 VAC power supply is available, it is provided to power input 164. In another embodiment, circuitry is provided that enables interface 126 to sense the voltage level of the attached power supply and operate accordingly.

The above-described embodiments of HVAC fan motor control systems provide cost-effective and reliable means for retrofitting an HVAC system with an ECM. More specifically, the above-described embodiments facilitate replacement of an original motor, for example, a PSC motor, with an ECM and provide methods of not only replicating performance of the original PSC motor, but increasing efficiency and improving comfort. The retrofit ECM facilitates energy savings, for example, by not solely operating at a cooling speed or a heating speed, but by also operating at a lower, fan only, speed. The fan only speed also facilitates increasing comfort by increasing the variations in air handling and by reducing HVAC system noise. The above-described embodiments also enable retrofitting a wide variety of HVAC systems with a reduced number of different motors than are currently used. As described above, in the exemplary embodiment, a minimum of six different original PSC motors can be replaced by two retrofit ECMs. The above-described methods of selecting the retrofit ECM to install, along with specific instructions on how to directly connect the outputs of a thermostat to the ECM, ease the installation process for a service technician and reduce the number of errors that may occur during retrofitting of the HVAC system.

Exemplary embodiments of HVAC fan motor control systems are described above in detail. The systems are not limited to the specific embodiments described herein, but rather, components of each system may be utilized independently and separately from other components described herein. Each system component can also be used in combination with other system components. More specifically, although the methods and apparatus herein are described with respect to retrofit ECMs, it should be appreciated that the methods and apparatus can also be applied to a wide variety of components used within an HVAC system.

While the invention has been described in terms of various specific embodiments, those skilled in the art will recognize that the invention can be practiced with modification within the spirit and scope of the claims.

What is claimed is:

1. An interface module for coupling at least one of a thermostat and a system controller to an electric motor, the interface module comprising:
    a first set of input terminals configured to receive an input signal from at least one of the thermostat and the system controller, the first set of input terminals comprising at least one thermostat input terminal and at least one system controller input terminal, wherein the at least one thermostat input terminal is configured to receive signal-level voltage signals from the thermostat and the at least one system controller input terminal is configured to receive, from the system controller, higher voltage signals than the signal-level voltage signals;
    control circuitry coupled to the first set of input terminals and configured to generate an output signal based at least partially on the input signal that corresponds to one of a plurality of motor profiles stored within a memory of the electric motor, wherein control circuitry is configured to generate the output signal based on at least one of the signal-level voltage signals and the higher voltage signals; and
    a first set of output terminals coupled to the control circuitry and configured to be coupled to input terminals of the electric motor and to provide the output signal to the electric motor.

2. An interface module in accordance with claim 1, wherein the electric motor comprises a plurality of motor input terminals each corresponding to one of the plurality of motor profiles stored within the memory of the electric motor, and wherein each terminal of the first set of output terminals is configured to be coupled to one of the plurality of motor input terminals.

3. An interface module in accordance with claim 2, wherein the control circuitry is configured to provide the output signal to a terminal of the first set of output terminals corresponding to a desired motor profile of the plurality of motor profiles.

4. An interface module in accordance with claim 3, wherein the control circuitry comprises a plurality of relays for providing the output signal to the terminal of the first set of output terminals corresponding to the desired motor profile.

5. An interface module in accordance with claim 1, wherein the control circuitry is configured to interpret at least one of an input signal from the thermostat and an input signal from the system controller to determine whether to provide an output signal corresponding to a motor profile associated with a heating mode, a motor profile associated with a cooling mode, or a motor profile associated with a continuous fan mode.

6. An interface module in accordance with claim 1, wherein the control circuitry comprises at least one delay element configured to delay a switch between motor profiles by a predefined amount.

7. An interface module in accordance with claim 6, wherein the delay element is configured to at least one of:
   delay providing the output signal corresponding to a heating mode motor profile by a predefined amount to allow time for a heating element to warm; and
   delay providing either the output signal corresponding to a continuous fan mode motor profile or the output signal corresponding to an instruction to turn-off the electric motor by a predefined amount to facilitate circulating heat from the heating element even after the heating element is turned off.

8. An interface module in accordance with claim 1, wherein the interface module is configured to be included within a heating, ventilation, and air conditioning (HVAC) fan motor control system, and wherein at least one of the plurality of motor profiles provides a substantially constant airflow regardless of a static pressure within an HVAC system that includes the HVAC fan motor control system.

9. An interface module in accordance with claim 1, wherein the at least one thermostat input terminal includes a heating input terminal configured to receive a heating call from the thermostat, a cooling input terminal configured to receive a cooling call from the thermostat, and an auto/on fan selection terminal configured to receive either an "auto" fan selection or an "on" fan selection from the thermostat, and wherein the control circuitry is configured to generate an output signal that corresponds to a continuous fan mode motor profile when the "on" fan selection is received and neither a heating call nor a cooling call is received, wherein the continuous fan mode motor profile is defined to include at least one of a lower torque and a lower speed than a heating mode motor profile and a cooling mode motor profile.

10. An interface module in accordance with claim 1 further comprising at least one power supply input configured to receive operating power for the interface module.

11. An interface module in accordance with claim 10 further comprising an input voltage level detector configured to sense a voltage level of an attached power supply and to provide the control circuitry with power at a predefined voltage level.

12. An interface module in accordance with claim 10, wherein the at least one power supply input comprises a first power supply input and a second power supply input, wherein a power supply may be coupled to either the first power supply input or the second power supply input, and wherein the first power supply input is configured to receive power at a first voltage level, and the second power supply input is configured to receive power at a second voltage level.

13. An interface module in accordance with claim 12 further comprising a voltage reducer coupled to the second power supply input and configured to reduce the second voltage level to equal the first voltage level.

14. An interface module in accordance with claim 1 further comprising a protective device coupled between at least one of the first set of input terminals and at least one of the first set of output terminals and configured to prevent a short of heating and/or cooling calls provided to the system controller.

15. An interface module in accordance with claim 14, wherein the protective device comprises a diode.

16. An interface module in accordance with claim 1, wherein the interface module is one of integrated within a motor controller and external to the motor controller.

* * * * *